Figure 1:
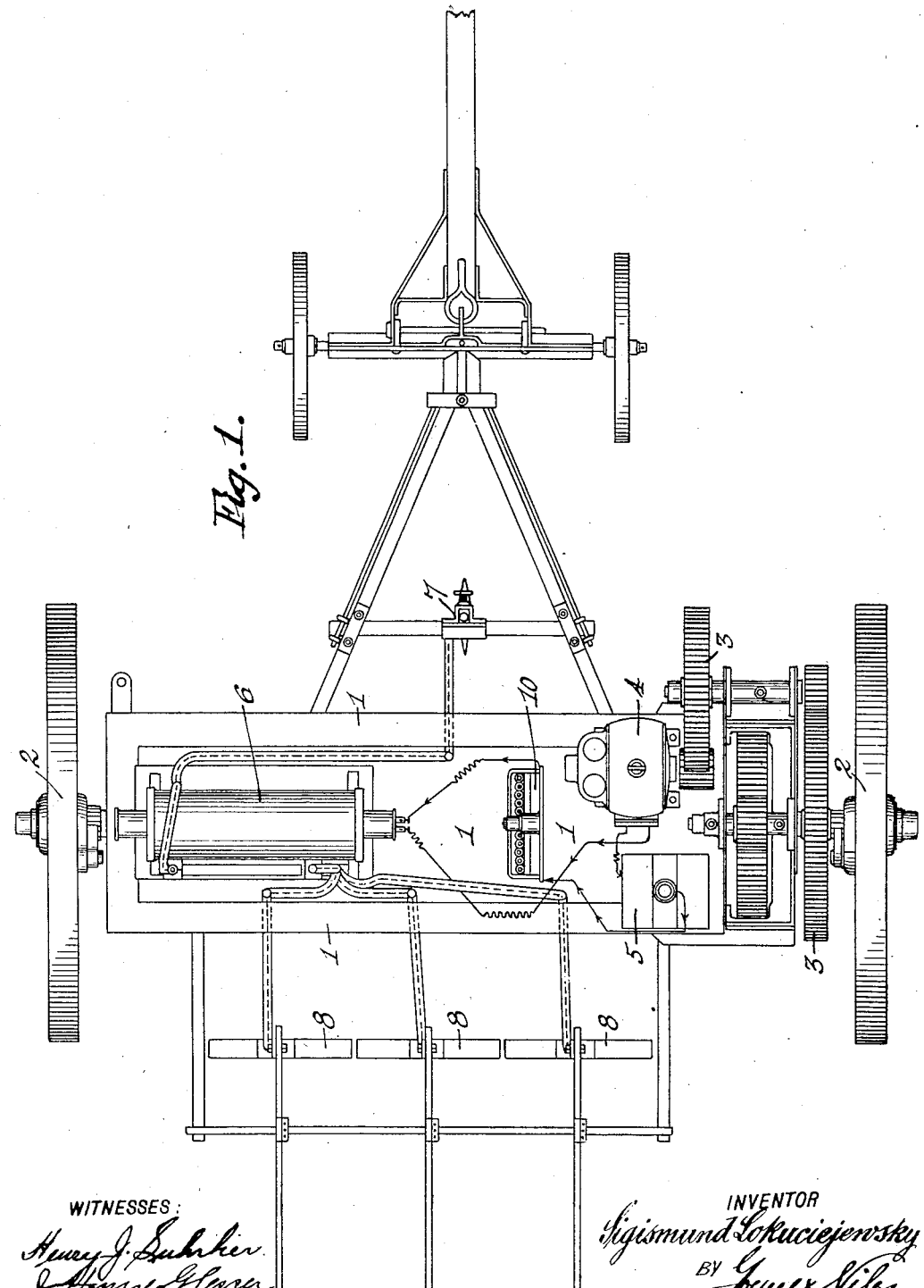

No. 779,791. PATENTED JAN. 10, 1905.
S. LOKUCIEJEWSKY.
METHOD OF FREEING THE SOIL, TREES, OR PLANTS FROM HARMFUL ANIMALS.
APPLICATION FILED AUG. 6, 1903.

4 SHEETS—SHEET 1.

WITNESSES:

INVENTOR
Sigismund Lokuciejewsky
BY
ATTORNEYS.

No. 779,791. PATENTED JAN. 10, 1905.
S. LOKUCIEJEWSKY.
METHOD OF FREEING THE SOIL, TREES, OR PLANTS FROM HARMFUL ANIMALS.
APPLICATION FILED AUG. 6, 1903.
4 SHEETS—SHEET 2.
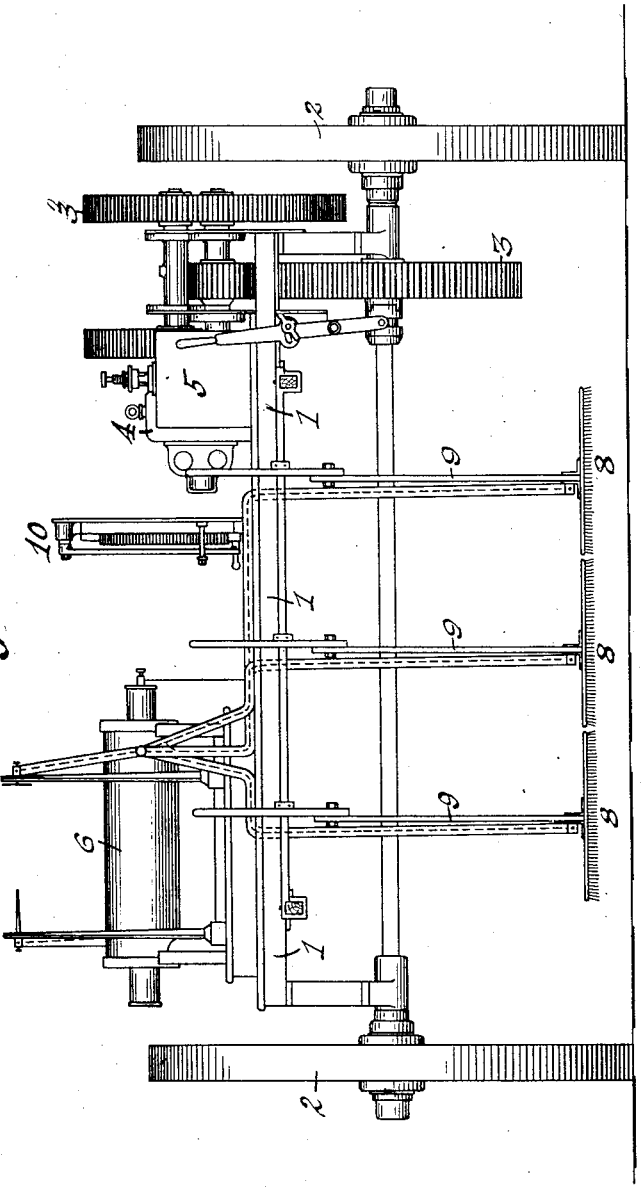
WITNESSES:
INVENTOR
Sigismund Lokuciejewsky
BY
ATTORNEYS.

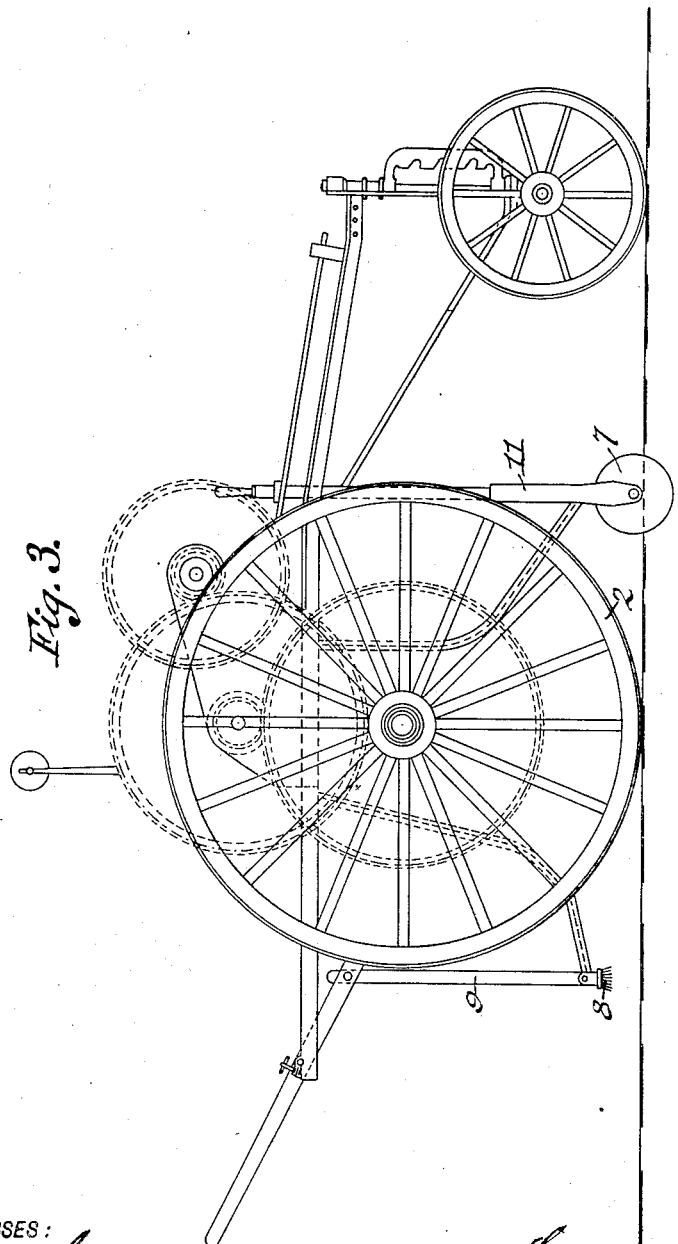

No. 779,791. PATENTED JAN. 10, 1905.
S. LOKUCIEJEWSKY.
METHOD OF FREEING THE SOIL, TREES, OR PLANTS FROM HARMFUL ANIMALS.
APPLICATION FILED AUG. 6, 1903.
4 SHEETS—SHEET 4.
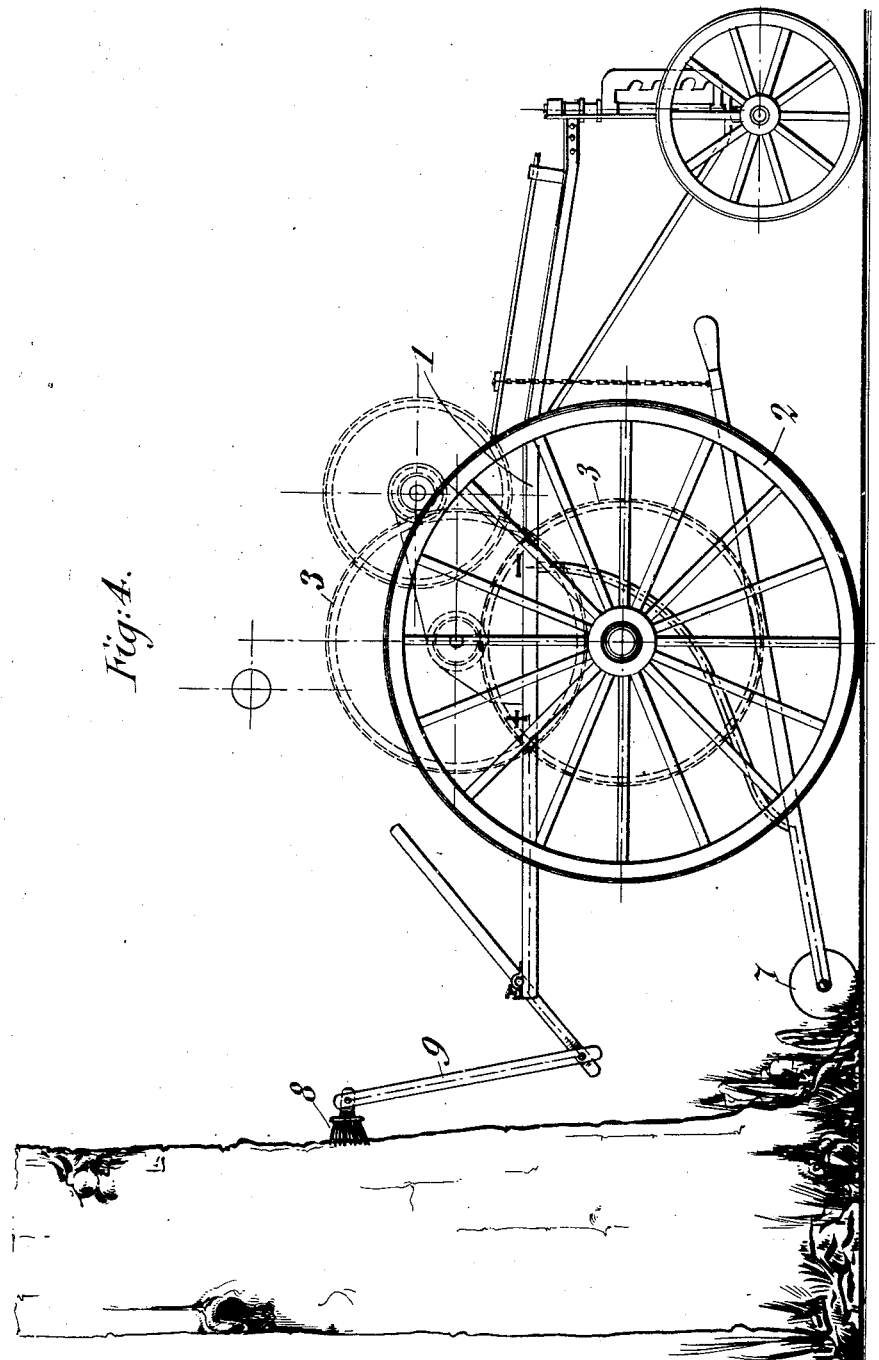

No. 779,791.

Patented January 10, 1905.

UNITED STATES PATENT OFFICE.

SIGISMUND LOKUCIEJEWSKY, OF ODESSA, RUSSIA.

METHOD OF FREEING THE SOIL, TREES, OR PLANTS FROM HARMFUL ANIMALS.

SPECIFICATION forming part of Letters Patent No. 779,791, dated January 10, 1905.

Application filed August 6, 1903. Serial No. 168,446.

*To all whom it may concern:*

Be it known that I, SIGISMUND LOKUCIE-JEWSKY, a subject of the Emperor of Russia, residing at Odessa, in the Empire of Russia, have invented a new and useful Method of Freeing the Soil, Trees, or Plants from Harmful Animals, of which the following is a specification.

My invention relates to a new method of electrically freeing the soil, a tree, or plant from insects, caterpillars, worms, maggots, slugs, and other similar harmful animals in or on the soil, tree, or plant and of increasing the productivity of the soil. This method consists in subjecting the soil, tree, or plant infected or covered with the harmful animals to the action of an alternating current of high tension and frequency, whereby the said animals are at once destroyed and the soil is electrified and charged with ozone.

The present invention is illustrated in the accompanying drawings, in which—

Figure 1 is a top view of the apparatus employed for carrying out my new method. Fig. 2 is a rear view thereof. Fig. 3 is a side view of the same; and Fig. 4 is also a side view, but showing the apparatus as applied to the tree.

Similar numerals of reference indicate corresponding parts.

In carrying out my invention a portable source of electric current is preferably employed. The source of electric current may be a storage battery or a mechanical generator capable of furnishing either a direct current or an alternating current. In the latter case the mechanical generator 4 is mounted upon a wheeled frame, which comprises a frame 1, carried by wheels 2 in such a manner that the generator will be rapidly rotated either directly from the axle of the wheels 2 of the car by means of gear-wheels 3, as shown in the drawings, or by a special motor mounted upon the frame. The current, whether direct or alternating, furnished by the storage battery or the mechanical generator is, as shown by the arrows, first led through an interrupter 5 of any suitable construction and after its passing the rheostat 10 enters the transformer or induction-coil 6. Thence the current is directly led back to the opposite pole of the generator 4. Thus a current of high tension and frequency and low density is produced by well-known means, which tension and frequency, if desired, could be still increased by other well-known means—as, for instance, those suggested by Tesla. One pole of this current terminates in a tool or other implement of any suitable kind, which is arranged to either slide on the surface of the soil, tree, or plant or to cut into the soil. As shown in the drawings, there is employed for this purpose a circular disk or wheel 7, carried by a rod 11, adjustably attached to the frame 1 of the car, so that according to the adjustment of this rod 11 the wheel 7 will cut more or less into the soil. This wheel or disk 7 is preferably sharpened at its edges, so that the forward movement of the car is not very much obstructed. The second pole of the electric circuit terminates in brushes or similar tools 8. Said brushes are fixed to the lower ends of rods or levers 9, whereby the brushes can be approached more or less to the surface of the soil. As shown in the drawings, the wheels or disks 7 cutting into the soil are arranged at the front end of the car, while the brushes 8 are located at the rear end of the car. The generated current flows from the transformer or induction-coil 6 through the disk 7 into the soil and through the latter to the other pole, passing in the form of strong sparks or radiating rays from the soil to the brushes 8 and then back through corresponding conducting-wires to the transformer. All the worms, maggots, slugs, insects, caterpillars, and other animals of any kind in and on the soil through which flows the alternating current of high tension and frequency will then be subjected to the action of the same, and thereby at once destroyed.

When the brushes 8 are raised from the surface of the soil, so that the sparking is prevented, then the soil becomes ozonified.

The animals on trees, plants, and flowers can equally be destroyed in a similar manner. The one movable pole, 8, is moved by hand either direct or by means of any suitable implement along the surface of the trunk or branch of the tree to be treated, and the other pole, 7, is introduced into the soil near the tree, when all the animals in the bark and on the surface of the tree and direct on the roots of the same will be destroyed. This mode of operation is clearly shown in Fig. 4. It is evident that other plants can be treated in a similar manner to free them of the harmful animals. The alternating current of high tension presents besides the destroying of the animals also the important advantage that it electrifies the soil between the two poles and charges it with ozone.

Trials have proved that the productivity of the soil treated in this manner has been increased not inconsiderably, so that the new method is sure to be also of special importance in this respect for farming purposes.

The before-mentioned apparatus is intended to be so arranged as to give at a potential of five hundred thousand (500,000) volts about five ten-millionths (0.0000005) of an ampere. These figures indicate the approximate relation of the volts to the amperes. It has been found that currents of such high potential and low-current density do not injure plants, but do seriously and mortally act on insects, worms, maggots, &c.

Obviously the construction of the portable source of current and of the transformer or induction-coil may be of any known kind without deviating from the spirit of my invention.

What I claim as my invention, and desire to secure by Letters Patent, is—

1. The method of freeing the soil and its products from harmful animals, which consists in subjecting the soil and its products to the action of an alternating current of high tension and frequency and low density.

2. The method of freeing the soil and its products from harmful animals, which consists in moving the poles of an induced circuit arranged at a convenient distance from each other along the surface of the soil and its products and passing an alternating current of high potential and frequency and low density between said poles, so as to electrify and ozonize the soil and its products and free the same from harmful animals.

3. The method of freeing the soil from harmful animals, which consists in moving the poles of an induced circuit at a convenient distance from each other, one pole being forced into contact with the soil and the other supported out of contact with the same, and then passing an alternating current of high tension and frequency and low density between the poles.

In testimony whereof I have signed my name to this specification in the presence of two subscribing witnesses.

SIGISMUND LOKUCIEJEWSKY.

Witnesses:
 THOMAS E. HEENAN,
 THOMAS MILES.